3,026,895
AUTOMATIC LUBRICATED GATE VALVE
Alexander S. Volpin, 10200 W. Broadview Drive,
Miami Beach, Fla.
Filed Feb. 7, 1957, Ser. No. 638,863
1 Claim. (Cl. 137—246.12)

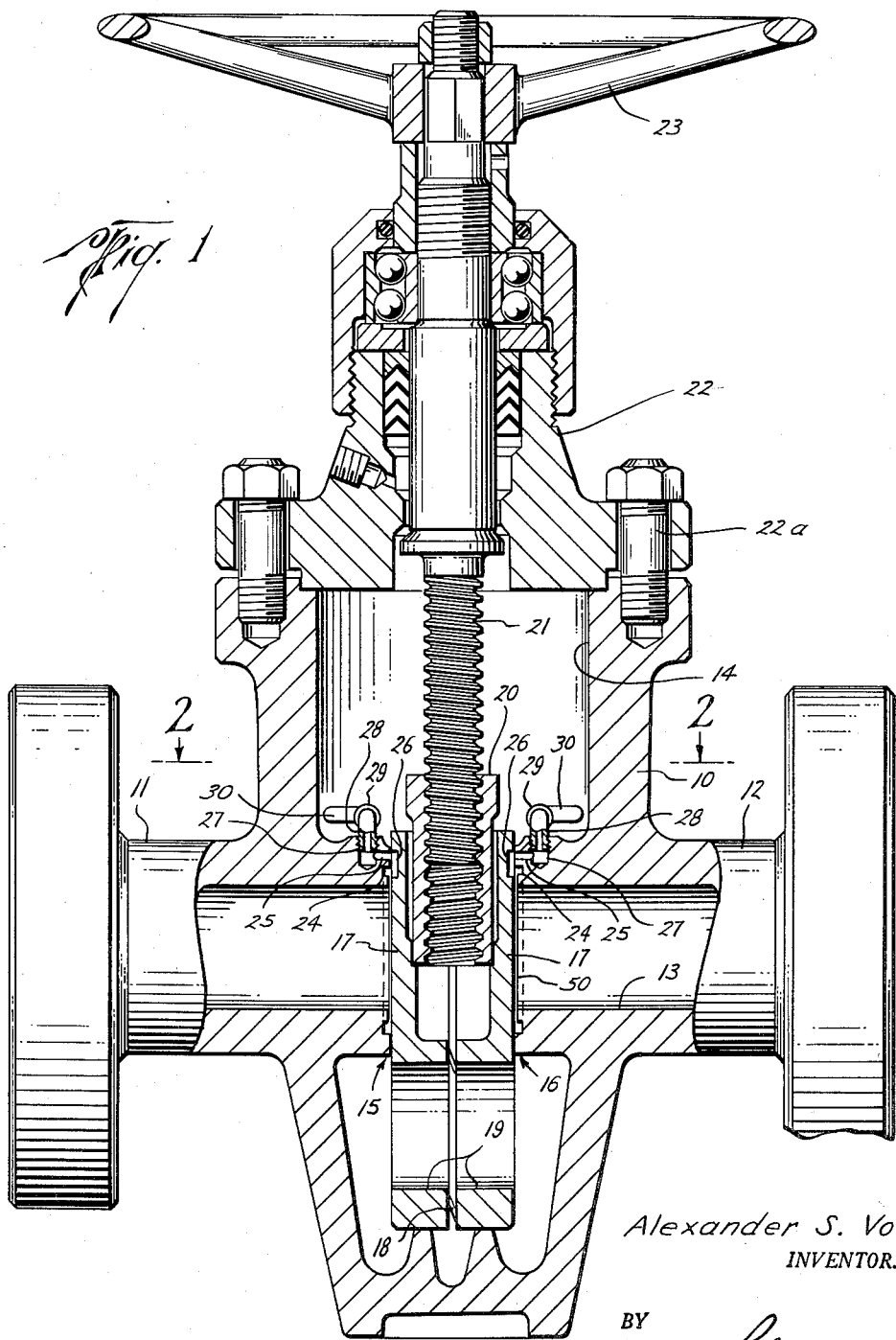

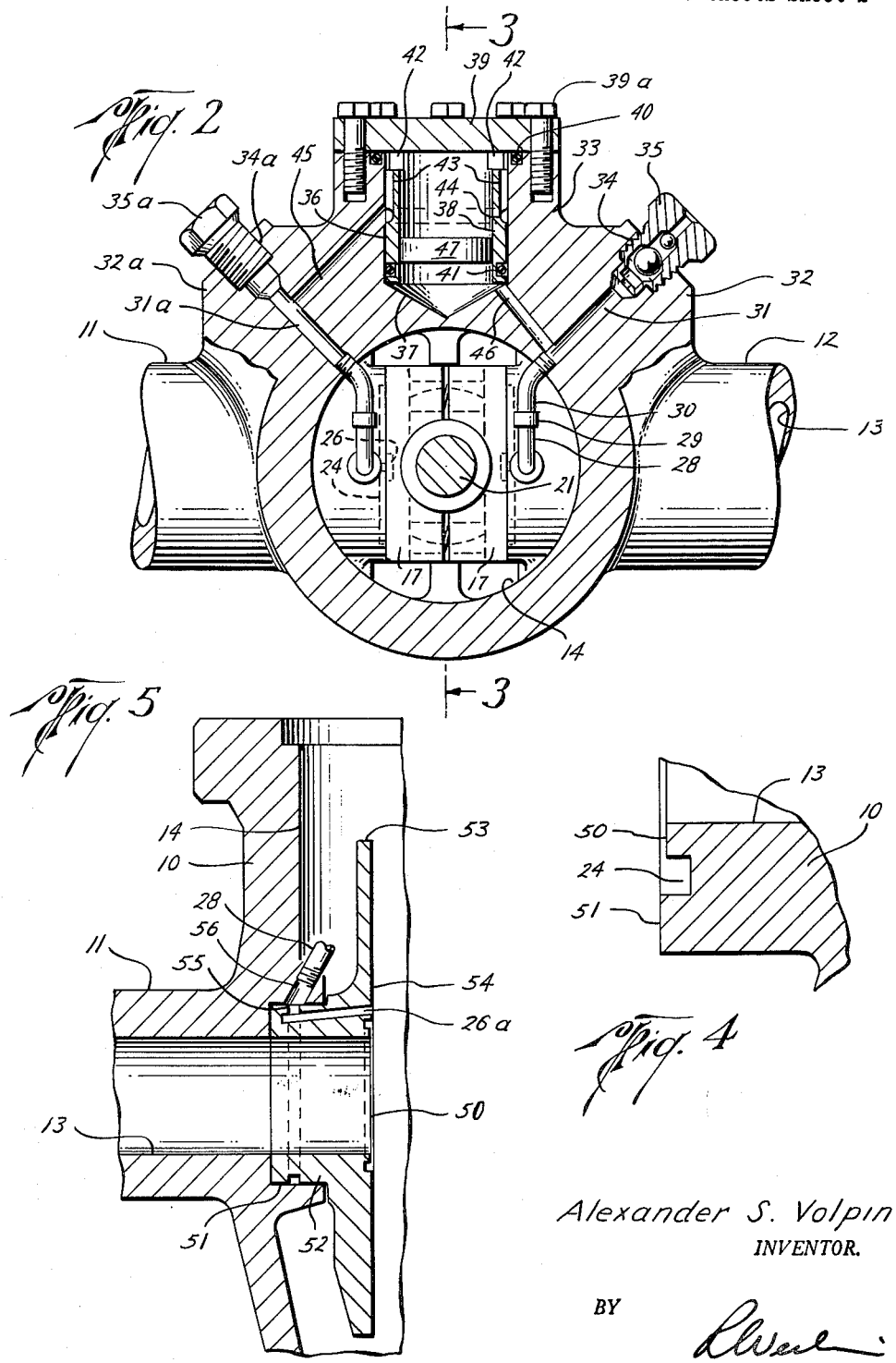

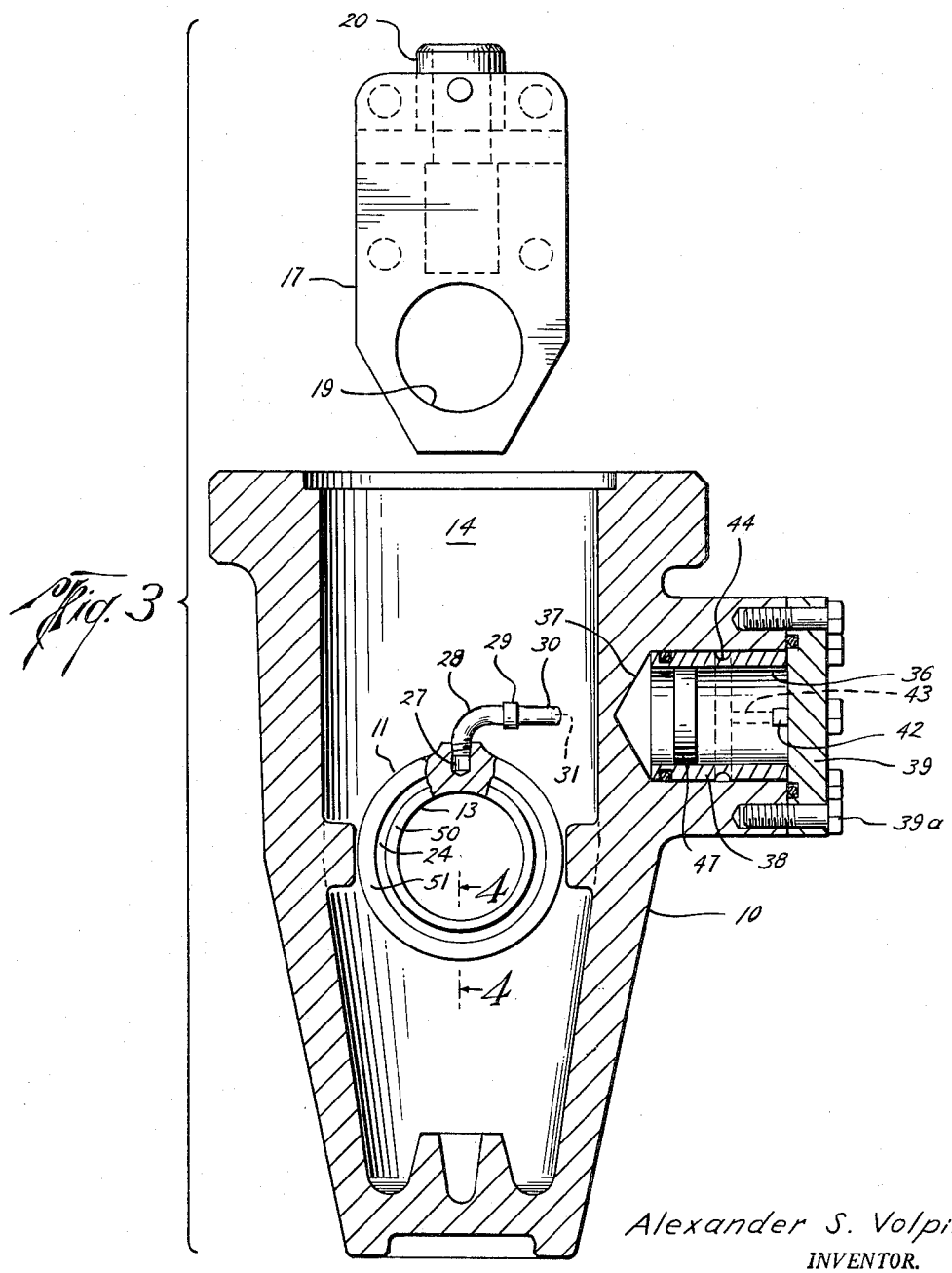

This invention relates to automatic sealing gate valves employing lubricant-type sealant material to automatically effect a seal about the gate and its seats in response to line pressure on the valve.

Ordinarily, gate valves of the type described employ separate lubricant reservoirs containing individual movable barriers responsive to the line pressure on the valve to feed lubricant to each side of the valve and this makes for greater complexity in the valve construction and increased cost of manufacture.

The present invention has for its primary object the provision of a single lubricant reservoir and a distribution system connected to both sides of the valve and arranged so that it may function irrespective of which side of the valve becomes the high- or line-pressure side when installed in a pipe line.

Another object is to provide in a gate valve of the kind described, lubricant reservoir means to which is connected a pair of lubricant passages leading to the respective gate seats and employing barrier means movable in the reservoir between the passages in response to line pressure on the valve.

A further object is to provide in an automatic lubricated gate valve, a single lubricant reservoir to which a pair of lubricant passages are connected at spaced points therein and lead to the respective gate seats, and employing a single barrier member movable between the points of connection of the passages in response to the line pressure on the valve.

An additional object is to provide means for injecting lubricant into the reservoir means on both sides of the movable barrier means.

Still another object is to provide an automatic lubricated gate valve employing a single lubricant reservoir having a pair of passages leading to the sealant distribution grooves in the respective gate seats, and a barrier in the reservoir movable between the passages in response to the differential pressure across the downstream seat, the gate seats being provided with pressure leak channels for effecting quick sealing when the gate is closed.

A further object is the provision of a single lubricant reservoir which is integral with the valve body and is provided with a pair of lubricant passages connecting opposite ends of the reservoir to the respective gate seats for delivering lubricant to the seat faces and to provide line pressure communication between the gate chamber of the valve and the opposite ends of the reservoir, said reservoir employing a single barrier movable therein between the passages, and lubricant injection channels for delivering lubricant to the reservoir on both sides of the barrier.

Other and more specific objects and advantages of this invention will become more readily apparent from the following detailed description when read in conjunction with the accompanying drawing which illustrate useful embodiments in accordance with this invention.

In the drawing:

FIG. 1 is a vertical sectional view of a gate valve in accordance with one embodiment of this invention and illustrating the gate members in closed position;

FIG. 2 is a transverse section taken along line 2—2 of FIG. 1;

FIG. 3 is a vertical section taken along line 3—3 of FIG. 2, the gate member being shown withdrawn from the body for purposes of clearer illustration;

FIG. 4 is an enlarged fragmentary sectional view of a portion of a gate seat taken generally along line 4—4 of FIG. 3; and FIG. 5 is a vertical sectional elevation of a portion of a modified gate valve illustrating the application of the lubricant distribution system of this invention to a removable gate seat construction.

Referring to the drawing, there is shown a through-conduit type, non-rising stem gate valve of generally conventional form, comprising the body 10 having opposed flow ports 11 and 12 forming the flowway 13, which is intersected interiorly of the valve body by the gate chamber 14, the inner ends of flow ports 11 and 12 defining the spaced-apart opposed annular gate seats 15 and 16, respectively.

A gate, comprising, a pair of identical gate members 17—17 of generally flat, rectangular configuration, is disposed for vertical movement between the seats 15, 16, the gate members being resiliently urged apart by springs 18—18 and into sliding engagement with the gate seats. The lower ends of the gate members are provided with registering transverse openings 19—19 forming a flow passage through the gate adapted to register with flowway 13 when the gate is in the raised or open position. A nut 20 is secured between the upper ends of the gate members and a gate stem 21 is threaded into the nut. The gate stem extends through a valve bonnet 22, in the usual manner, and has its upper end connected to an operating wheel 23, the rotations of which are transmitted through the stem to nut 20 and serve to raise and lower the gate. Bonnet 22 is secured to the upper end of body 10, in any usual manner as by means of the bolts 22a, to close the gate chamber and is provided with the usual bearings, seals, and stuffing boxes for the gate stem to seal the gate chamber against leakage of fluid passing through the interior of the valve.

The end faces of each of the seats 15, 16 and the opposing outer faces of the adjacent gate members 17 are provided with a groove arrangement into which the sealant-lubricant is fed in order to seal between the downstream seat and gate member when the valve is in the closed position. These sealing groove arrangements may be of various forms and some suitable ararngements are illustrated in my U.S. Patents Nos. 2,433,638, 2,657,898, and Re. 23,957, the arrangement illustrated herein being one of the various forms in such arrangement which may be used. As illustrated, the end face of each seat is provided with a circular groove 24 surrounding flowway 14 and is also provided with a lubricant-supply passage 25 which opens to the seat face at a point radially spaced a short distance from the groove 24. Each gate member is provided in its outer face with a small circular recess or channel 26, which is positioned in the face of the gate member to provide a communication channel between the end of passage 25 and groove 24 when the gate is in the closed position, as illustrated particularly in FIG. 1. Each of the supply passages 25 communicates with an internally threaded socket 27 opening to the interior of gate chamber 14. Each of the sockets 27 is adapted to receive a threaded pipe nipple 28 which is suitably joined, as by means of a collar or coupling 29, to a second pipe nipple 30, one of which is threaded into a passage 31, and the other into a passage 31a, which are provided in the wall of body 10, as best seen in FIG. 2. The portion of the wall of body 10, which contains the passages 31 and 31a, may be thickened to form angularly projecting bosses 32 and 32a and a central boss 33 extending between bosses 32 and 32a. Passages 31—31a extend through bosses 32 and 32a, respectively, into communication with threaded sockets 34 and 34a, respectively which are adapted to receive conventional grease injector fittings 35 and 35a, respectively, for the introduction of sealant-lubricant into the respective passages 31 and 31a. Central boss 33 is bored from its outer end to form a chamber 36 in the thickened wall portion of body 10. Chamber 36 is closed at its inner end by the end wall 37 and is fitted with a tubular liner 38 which is slidably insertable into chamber 36. A cap 39 is adapted to be removably secured by means of cap screws 39a to the outer end of boss 33 to form a closure for the outer end of chamber 36 and to hold liner 38 in position inside chamber 36. A packing ring 40 is arranged between the end of boss 33 and cap 39 surrounding chamber 36 to form a seal for the outer end of the chamber, and a packing ring 41 is arranged between the exterior of liner 38 and the wall of chamber 36, near the inner end of the liner, to form a fluid-tight seal about the inner end of the liner. Near its outer end liner 38 is provided with a pair of ports 42—42 which are in communication with longitudinal grooves 43—43 provided in the outer surface of liner 38 which extend to about the mid-point of liner 38 where they communicate with a circumferential groove 44. The latter communicates with a laterally extending passage 45 which connects to passage 31a at a point between fitting 35a and nipple 30. A second lateral passage 46 communicates with the inner end of chamber 36 through end wall 37 and its opposite end connects into passage 31 at a point between fitting 35 and nipple 30. A Piston member 47 is slidably mounted in the bore of liner 38 to form a movable barrier between the points at which ports 42 and passage 46 connect to chamber 36, which constitutes the lubricant reservoir for the sealing system of the valve.

Ports 42, grooves 43 and 44, passages 45 and 31a, nipples 30 and 28, socket 27 and passage 25 constitute a first lubricant-supply passage leading from the outer end of the reservoir 36 to the end face of gate seat 15. And when the gate is in the closed position, as shown in FIG. 1, channel 26 places this first passage into communication with groove 24 in gate seat 15. Similarly, passages 46 and 31 and nipples 30 and 28, together with socket 27 and passage 25, form a second lubricant-supply passage from the inner end of reservoir 36 to the end face of gate seat 16, and this passage is likewise placed into communication with groove 24 in gate seat 16 by means of channel 26 when the gate is in the closed position. It will be understood that when the gate is in the open position channels 26 will move upwardly therewith and cut-off communication between both lubricant-supply passages and the sealing grooves in the gate seats. Also, passages 31 and 46 provide means by which lubricant may be injected through fitting 35 and into the inner end of reservoir 36 on the inner side of barrier 47. Similarly, passages 31a and 45, grooves 44 and 43, and ports 42 provide means by which lubricant injected through fitting 35a may be introduced into the outer end of reservoir 36 on the outer side of barrier 47.

With the arrangement thus described, it will be seen that the lubricant passage arrangement provides means by which lubricant may be injected into the reservoir on either side of barrier 47, as may be desired. Ordinarily, the lubricant will be injected into the portion of the reservoir which will feed the downstream side of the valve, the other or upstream side of the valve being ordinarily left free of lubricant so that the upstream passages, which provide communication to the upstream side of the reservoir, will function as a channel through which the upstream line pressure may flow and act on the inner side of barrier 47 in order to urge it in the opposite direction and thereby force lubricant through the other passage into the downstream gate seat. As will be understood by those familiar with automatic sealing gate valves of the kind herein described, the upstream pressure, when the valve is in the closed position, will urge the upstream gate member away from the upstream seat against the resistance of springs 18 sufficiently so that upstream pressure may leak into the gate chamber and thence through the upstream passage to the upstream side of the barrier, as noted.

With the arrangement described, it will be seen that the valve may be installed in a pipe line in either direction without affecting the functioning of the valve and the automatic sealing system.

Since the automatic sealing of the downstream seat is effected by the pressure differential between the line pressure on the upstream side of the valve and the downstream pressure, the gate seats may be provided with pressure leak channels of a form described in my U.S. Patent Re. 23,957, in order to intensify the pressure drop across the downstream seat and quicken the automatic sealing action of the sealing system. To this end the end faces of the gate seats may be of the form shown in the drawings, and more particularly in FIGS. 1, 3 and 4. Groove 24 will be radially spaced outwardly from the margin of flowway 13 to provide the annular section 50. This section 50 may be depressed slightly throughout its circumference relative to the plane of section 51 on the radially outer side of groove 24, thereby providing an annular channel between the groove and the flowway, and thus forming an intentional leak passage which will permit a more rapid pressure drop across the downstream seat and resulting quicker movement of sealant into groove 24. The extent of the depression or off-setting of section 51 will be quite small so that there will be little loss of sealant since the latter is generally of a quite viscous nature under the conditions of use. It will be understood that instead of an annular leak channel, such as that formed by depressing or offsetting section 50, a radial scratch or channel may be provided across section 50 to afford a pressure leak from groove 24 into flowway 13 to provide the desired pressure drop.

The arrangement above described provides a system for effecting automatic sealing of gate valves while using only a single lubricant reservoir and a single movable barrier therein. Moreover, the reservoir may be incorporated in an integral portion of the wall of the valve body and thereby simplify the overall construction of automatic lubricated gate valves.

FIG. 5 illustrates a modification whereby the sealing system herein described may be applied to gate valves employing removable gate seats, without departing from the principles of this invention. As seen in FIG. 5, the inner end of each flow port (one shown) is counterbored to form the recess 51 which is adapted to receive the hub 52 of a conventional seat plate 53, the outer face of which surrounds flowway 13 and defines the gate seat 54. The latter is provided with a groove arrangement and pressure leake channel identical with those in the previously described embodiment, and a passage 26a, corresponding to passage 25 of the previous embodiment, extends to a point adjacent the inner end of hub 52 whence it emerges through a passage 55 adapted to register with a socket 56 which opens through the wall of flow port 11 into gate chamber 14 and is threaded internally to receive the inner end of nipple 28. The remainder of the lubricant system will be identical with that previously described.

It will be understood that numerous changes and modifications may be made in the details of the illustrative embodiment within the scope of the appended claim, but without departing from the spirit of this invention.

What I claim and desire to secure by Letters Patent is:

In a lubricant-sealed gate valve having a gate chamber and a movable gate therein, a flowway intersecting said chamber and provided with opposed gate seats, a single generally cylindrical chamber integrally formed within a wall portion of the valve body and defining a sealant reservoir, a tubular sleeve coaxially disposed in said reservoir, means sealing between the wall of the reservoir and the sleeve intermediate the ends thereof, a pair of passages extending through said wall, said passages communicating with the interior of said sleeve at longitudinally spaced points on opposite sides of said sealing means and opening through said wall into the gate chamber, sealant channels in the gate seats communicating between the gate chamber and the end faces of said seats, separable conduit portions disposed within the gate chamber exteriorly of said wall and said seats connecting said passages to said channels whereby to transmit sealant from said reservoir to said gate seats and to provide line pressure communication between said gate chamber and said reservoir, a movable barrier member disposed in said sleeve to move axially thereof between said spaced points in response to line pressure on the valve, and means to introduce sealant into said reservoir on both sides of said barrier member.

References Cited in the file of this patent

UNITED STATES PATENTS

| | | |
|---|---|---|
| Re. 23,957 | Volpin | Mar. 1, 1955 |
| 910,401 | Lunken | Jan. 19, 1909 |
| 1,980,768 | Specht | Nov. 13, 1934 |
| 2,107,182 | Henderson | Feb. 1, 1938 |
| 2,269,886 | Volpin | Jan. 13, 1942 |
| 2,317,657 | Volpin | Apr. 27, 1943 |
| 2,433,638 | Volpin | Dec. 30, 1947 |
| 2,530,744 | Volpin | Nov. 21, 1950 |
| 2,565,609 | Jacobsen | Aug. 28, 1951 |
| 2,568,935 | Smith | Sept. 25, 1951 |
| 2,591,031 | Volpin | Apr. 1, 1952 |
| 2,647,720 | Volpin | Aug. 4, 1953 |
| 2,842,153 | Volpin | July 8, 1958 |

FOREIGN PATENTS

| | | |
|---|---|---|
| 445,636 | Great Britain | Apr. 16, 1936 |